Oct. 3, 1967     A. C. POPIVALO     3,344,962
DISPENSING DEVICE
Filed March 4, 1966
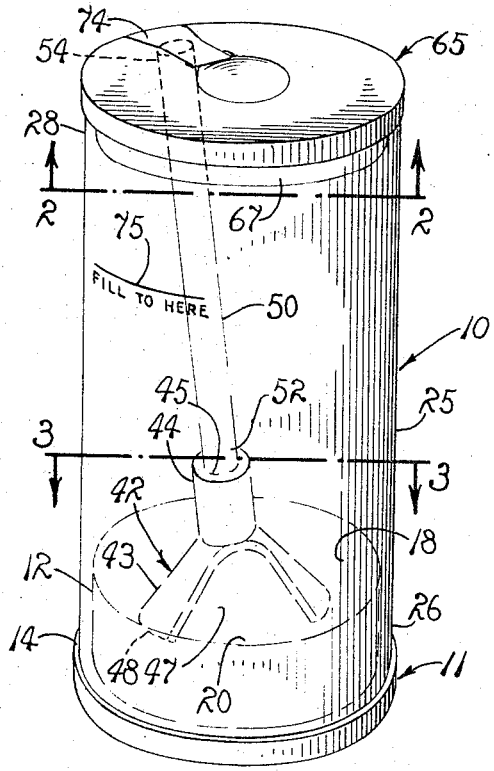
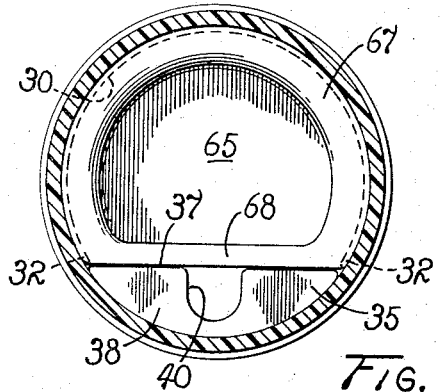
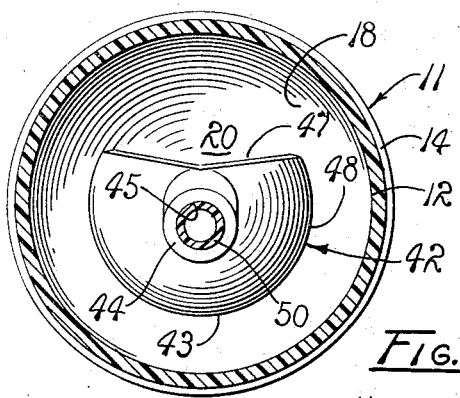
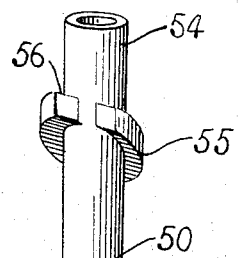
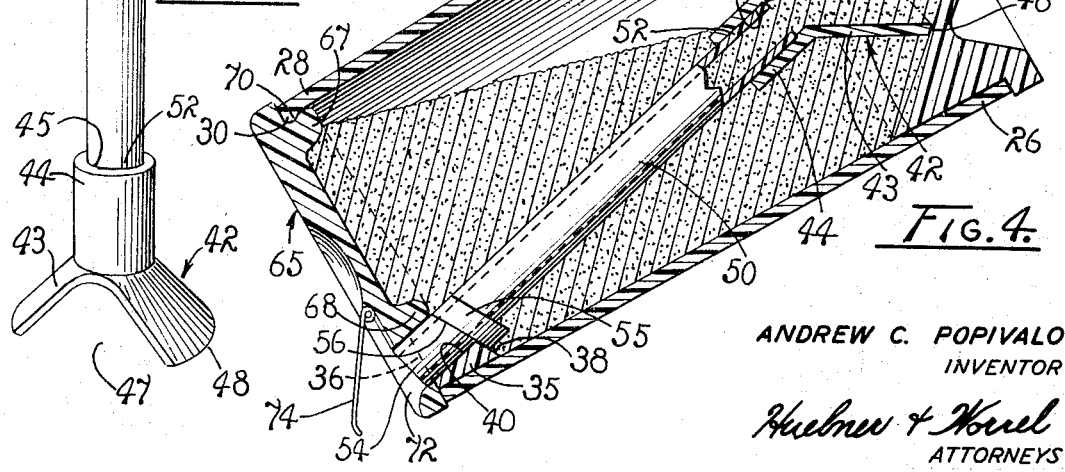
ANDREW C. POPIVALO
INVENTOR
Huebner & Worrel
ATTORNEYS

United States Patent Office 3,344,962
Patented Oct. 3, 1967

3,344,962
DISPENSING DEVICE
Andrew C. Popivalo, 2028 Webster St.,
Sanger, Calif. 93657
Filed Mar. 4, 1966, Ser. No. 531,836
5 Claims. (Cl. 222—456)

ABSTRACT OF THE DISCLOSURE

A dispensing device for a container adapted to hold a predetermined relatively large volume of flowable bulk material having a measuring scoop adapted to receive a predetermined measured lesser quantity of such material in the container incident to tipping of the container including a discharge tube connected to the measuring scoop and outwardly extended from the container for directing the lesser volume of material from the container in its tipped condition but precluding further depletion of the contents of the container during each tipping sequence. The container further provides a recessed bottom wall for supporting the measuring scoop within the container which coacts therewith to feed material into the measuring scoop when the container is in an upright position and which insures complete discharge of the final fractional portions of the material from a nearly depleted container.

---

Conventional containers for flowable bulk material such as sugar, salt, detergents, dehydrated instant food-mix products and the like usually contain a relatively large volume of such material which is manually removed from the container in predetermined measured amounts by spoons, cups, scoops, ladles and the like of appropriate size. When the contents of the container for such products must be poured into the measuring receptacle, it is difficult accurately to fill the receptacle to a predetermined desired level. Frequently, too much material is discharged, causing the receptacle to overflow and the material to be spilled and scattered about the surrounding area. If the container is provided with a relatively small pouring spout, it is extremely difficult and usually impossible to collect and to pour the excess back into the container without additional spillage and waste. For example, the sugar dispensers normally used in restaurants and the like provide a small pouring spout through which the sugar is discharged by tipping the dispenser to permit a gravitational flow of the sugar therefrom. The sugar is discharged directly into a food container such as a cup containing coffee or the like or into a teaspoon for measuring the amount of sugar to be mixed with the coffee or other food product. In the first instance, the amount discharged can only be visually determined by estimating the rate of flow of the sugar as it is discharged from the dispenser. Such rate of flow varies considerably depending upon the moisture content and flowability of the sugar. The latter procedure does not provide much improvement because of the difficulty in precisely terminating the flow of sugar from the dispenser after the desired amount has been discharged into the spoon without heaping or overflowing. Similar problems are universally experienced during the dispensing of the other above named materials from their respective dispensing containers.

Accordingly, it is an object of the present invention to provide an improved dispensing device for flowable bulk material.

Another object is to provide such an improved dispensing device which is capable of successively discharging a predetermined precise volume of such material.

Another object is to provide a dispensing device of the character described which is capable of successively discharging such predetermined precise volumes of material irrespective of variations in the moisture content and flowability of the material within reasonable limits.

Another object is to provide a dispensing device having a container for such material which has no moving parts.

Another object is to provide a dispensing device in which the measuring portion thereof is readily removable from the container for ease of cleaning.

Another object is to provide a dispensing device in which the measuring portion is automatically precisely positioned within the container.

Another object is to provide a dispensing device having a measuring portion which may be provided in various sizes for dispensing varied amounts which are interchangeable and automatically positionable within a single common container.

Another object is to provide a dispensing device in which the measuring portion thereof is disposed within the container so as to minimize the required extent of tipping of the container during the dispensing operation.

Other objects and advantages of the present invention will subsequently become more clearly apparent upon reference to the following description in the specification and accompanying drawing.

In the drawing:

FIG. 1 is a perspective view of the dispensing device of the present invention disposed in a substantially upright static position.

FIG. 2 is a transverse horizontal section through the dispensing device taken on line 2—2 of FIG. 1.

FIG. 3 is a transverse horizontal section through the dispensing device taken on line 3—3 of FIG. 1 showing a measuring scoop of the present invention concentrically disposed against the bottom wall of the container.

FIG. 4 is a central longitudinal section through the dispensing device disposed in a tipped material discharging position.

FIG. 5 is a perspective view of the scoop and discharge tube removed from the container.

A dispensing device for flowable bulk material is shown in the disclosed embodiment of the present invention in the form of a sugar dispenser providing an elongated cylindrical container 10. Such embodiment is only representative of the many varied forms in which the dispensing device of the present invention has utility and the container is not to be limited to the particular form shown. The container 10 has a circular base 11 having an upper portion 12 of reduced diameter which forms an annular shoulder 14. The base provides a bottom wall 17 for the container having an inner conical surface 18 angularly sloping from the periphery of the base at approximately a 45° angle with respect to the longitudinal axis of the container. The bottom wall further includes an arcuate apex portion 19 having a corresponding inner surface 20 continuous with the inner conical surface 18.

An elongated cylindrical side wall 25 is provided having a lower end 26 with the side wall tapering to an upper end 28 of somewhat reduced diameter. The lower end of the side wall is fitted in circumscribing relation about the portion 12 of reduced diameter of the base 11 in abutting relation to the shoulder 14 and is constrained in such position by any suitable adhesive material between the lower end of the side wall and the base. It is readily apparent that in a commercial embodiment of the present invention the side wall and base can be integrally formed preferably from a transparent glass or plastic material so that the contents of the container are readily visible through the side wall.

The upper end 28 of the side wall 25 provides a nearly annular radially inwardly extended rim bead 30 having opposite ends 32 terminating in spaced symmetrical relation on opposite sides of a radial plane through the central axis of the container. A wall segment 35 is extended in bridging relation between the ends of the rim bead and provides an upper surface 36 disposed in the plane of the upper end 28 of the side wall. The wall segment may be secured to the side wall by a suitable adhesive or it may be formed integrally with the side wall. The wall segment includes a substantially straight inner reaction surface 37 extended between the ends of the rim bead and a lower surface 38 acutely angularly related to a plane normal to the central axis of the container. A centrally disposed notch 40 is formed through the wall segment 35 in acute angular relation to the side wall 25 of the container 10.

A material measuring scoop 42 is removably disposed within the container 10 adjacent to the bottom wall 17. The scoop has a substantially conical wall 43 and an integral tubular stem 44 provided with a counterbore 45 terminating short of the conical wall. The conical wall has a material inlet opening 47 formed therein and a substantially circular edge 48 adapted to engage the inner conical surface 18 of the bottom wall 17 of the container.

An elongated discharge tube 50 provides an inner end 52 extended into the counterbore 45 of the stem 44 of the scoop 42 and is constrained against axial movement relative to the scoop by a suitable adhesive material. Again, it is readily apparent that the described scoop and tube assembly may be of unitary construction. The discharge tube includes an opposite outer end 54 which is disposable within the notch 40 of the wall segment 35. In order to constrain the discharge tube and scoop assembly in the operating position of FIG. 4, a substantially annular collar 55 is mounted about the discharge tube adjacent to its outer end. The collar provides an upper surface 56 which is complementarily fitted in facing engagement with the lower surface 38 of the wall segment 35 so as to wedge the edge 48 of the scoop 42 against the corresponding diameter of the inner conical surface 18 of the bottom wall 17 of the container. Accordingly, the scoop 42 is automatically disposed in self-centering relation with respect to the bottom wall so as to form therebetween a material measuring pocket 60. The mating surfaces 37 and 56 of the wall segment 35 and the collar 55, respectively, further serve to insure proper orientation of the material inlet opening 47 of the scoop 42 within the container 10 and to prevent inadvertent rotation of the scoop from such desired position.

A top wall or cap 65 is provided for the container and has an inner flange 67 extended into the upper end 28 of the side wall 25. The flange is substantially circular except for a straight portion 68 adapted to engage in facing relation the straight inner surface 37 of the wall segment 35. A recess 70 is formed between the top wall and the flange for receiving the rim bead 30 of the side wall 25 in tightly clamping relation. The top wall provides a discharge opening 72 which is aligned with the outer end 54 of the discharge tube 50 when disposed in the notch 40 of the wall segment 35. A flapper-type closure plate 74 is preferably hingedly mounted on the top wall in gravitationally closing relation to the discharge opening when the container is disposed in its substantially upright static position of FIG. 1. A fill line 75 is formed on the side wall 25 of the container 10 as by etching, painting, or the like to indicate the filling level for material within the container for optimum operation of the dispensing device.

*Operation*

The operation of the described embodiment of the subject invention is believed to be readily apparent and is briefly summarized at this point. Prior to use, the dispensing device is disassembled so that the individual components thereof may be easily cleaned. In order to assemble the scoop 42 and discharge tube 50, the assembly is inserted into the container 10 and the edge 48 of the scoop rested against the inner conical surface 18 of the bottom wall 17 thereof. It is important to note that the substantially circular edge 48, when slidably positioned against the inner conical surface 18, automatically centers the scoop with respect to the arcuate apex portion 19 of the bottom wall. The outer upper end 54 of the discharge tube is then drawn laterally toward the side wall 25 of the container and inserted into the notch 40 in the wall segment 35. The discharge tube and scoop may be rotated about their common axis if necessary to align the respective surfaces 38 and 56 of the wall segment 35 and the collar 55 to permit full insertion of the outer end of the discharge tube into the notch 40 and proper orientation of the material inlet opening 47 of the scoop 42 within the container.

The container 10 is then filled with the appropriate flowable bulk material, such as sugar, to the fill line 75. The cap or top wall 65 is then snapped onto the upper end 28 of the side wall 25 by engagement of the rim bead 30 over the flange 67 and into the recess 70 in the top wall. It is noted that the mating facing engagement of the inner surface 37 of the wall segment 35 with the straight portion 68 of the flange 67 accurately orients the top wall with respect to the side wall so as precisely to align the discharge opening 72 with the outer end 54 of the discharge tube 50.

When it is desired to discharge a predetermined measured amount of material from the container 10, the container is tipped from its static upright position of FIG. 1 to the dispensing position of FIG. 4. During such tipping movement, the measuring pocket 60 formed by the combined space between the scoop and the arcuate apex portion 19 of the bottom wall 17 is completely filled with the material within the container. As the container approaches the fully tipped position of FIG. 4, the primary level of material within the container drops below the inlet opening 47 in the scoop 42 to leave within the measuring pocket 60 a precisely predetermined volume of material which, upon further tipping movement of the container, is gravitationally discharged through the discharged tube 50.

It is noted that the closure plate 74 normally seeks a substantially pendant position by unrestricted movement about its hinge connection with the top wall so as automatically to be opened in such operating tipped position of the container in FIG. 4. After such predetermined volume of material is discharged, the container is returned to its upright position of FIG. 1 which causes the remaining material therein to be returned against the bottom wall 19 for automatically recharging the measuring pocket 60. It is readily apparent that on subsequent manipulation of the container to its operating-dispensing position of FIG. 4, the exact same amount of material is dispensed from the pocket and outwardly of the container through the discharge tube 50. It is further significant that when the contents of the container are nearly depleted, the small volume of material remaining will be completely discharged from the container by virtue of the conical inner surface 18 of the bottom wall which is effective to feed every last particle of material into the measuring pocket 60 between the bottom wall and the scoop 42.

As previously described, the scoop 42 can be constructed of various sizes so as to vary the amount of material dispensed from the container 10 during each dispensing sequence. If a larger volume of dispensed material is desired, the diameter of the scoop 42 is increased a predetermined amount so that when the volume of the scoop is combined with the similarly increased volume of the space between the scoop and the bottom wall of the container, the desired volume to be dispensed is obtained. In utilizing a scoop of a larger diameter, the distance between the edge 48 of the scoop and the upper surface 56 of the collar 55 needs to be correspondingly shortened to accommodate the repositioning of the scoop on a correspondingly larger diameter circle on the inner conical surface 18 of the bottom wall. It is readily apparent that many sizes of scoops can be alternatively employed within the container 10 with each size cooperating with the inner conical surface 18 of the bottom wall of the container in an identical manner as that previously described. In all instances, the scoop is automatically centered in the desired operating position. Accordingly, a number of different size measuring pockets 60 may be obtained for dispensing varied amounts of material from the same container.

In view of the foregoing, it is readily apparent that the structure of the present invention provides an improved dispensing device for flowable bulk material. The dispensing device is effective successively to discharge a predetermined precisely measured volume of material from the container when tipped to the usual pouring position of conventional dispensing devices. The structure of the present invention is also effective to dispense such precisely measured amount of material irrespective of the volume of material within the container or its moisture content which ordinarily adversely affects the flowability of material from conventional dispensers.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A dispensing device for flowable bulk material adapted successively to release a predetermined, precisely measured, quantity of such material comprising a container for a predetermined relatively large volume of such material and having a predetermined upright static position, measuring means disposed within the container to receive a predetermined measured lesser quantity of such material in the container incident to tipping of the container from said upright static position, discharge means operatively associated with said measuring means within the container for directing said lesser volume of material from the container in said tipped position while precluding the escape and further depletion of said large volume of material while the container is tipped, and material feeding means in the container gravitationally to direct the final fractional portions of material from a nearly depleted container into said measuring means when the container is in its static position to insure subsequent complete discharge of such fractional portions from the container.

2. The dispensing device of claim 1 wherein said container has a central longitudinal axis and includes a bottom wall having a recessed portion forming said material feeding means, a side wall, and a removable top wall providing a discharge opening radially displaced from said central axis of the container and adjacent to the side wall thereof; said measuring means being disposed adjacent to said recessed portion of the bottom wall in substantially concentric relation to said central axis; and said discharge means being connected to said measuring means and extended through said opening in the top wall of the container.

3. The dispensing device of claim 2 in which said recessed portion of the bottom wall of the container provides an inner downwardly inwardly sloping material feeding surface; and said measuring means provides a scoop having a substantially circular edge complementarily engageable in self-centering relation with said sloping surface of the bottom wall of the container.

4. A dispensing device for flowable bulk material adapted successively to release a predetermined precisely measured quantity of such material comprising a substantially cylindrical container having a bottom wall, side wall, and removable top wall for storing a predetermined relatively large volume of such material and having a predetermined upright static position, said container including a central longitudinal axis and said top wall providing a discharge opening from the container in radially spaced relation from said axis adjacent to said side wall thereof, said bottom wall including an inner substantially conical downwardly inwardly sloping material feeding surface; a measuring scoop having an upwardly tapering substantially conical wall providing a lower arcuate edge portion and a material receiving opening formed in said wall of the scoop; an elongated material discharge tube having an end connected to said scoop and an opposite end; and retainer means within the container releasably mounting said opposite end of the discharge tube in aligned relation with said discharge opening in the top wall of the container with said arcuate edge of the scoop being complementarily engageable with the material feeding surface of the bottom wall of the container whereby the scoop is constrained in self-centered predetermined relation to said bottom wall, said material feeding surface and said scoop combining to form a measuring compartment to receive a lesser measured volume of material through said opening in the wall of the scoop incident to tipping of the container from said upright static position for discharge of such lesser measured volume of material from the container through said discharge tube while precluding the escape and further depletion of said large volume of material during each tipping sequence, said material feeding surface of the bottom wall also being effective gravitationally to direct the final fractional portions of material from a nearly depleted container into said measuring compartment when the container is in its static position to insure subsequent complete discharge of such fractional portions from the container.

5. The dispensing device of claim 4 in which said retainer means comprises a tube mounting wall radially inwardly extended from said side wall of the container adjacent to said top wall thereof having a centrally disposed notch therethrough and an inner reaction surface angularly related with respect to a plane normal to said central axis of the container; and a substantially annular collar disposed in circumscribing relation about the discharge tube adjacent to its opposite end providing an annular surface complementarily to engage the reaction surface on the mounting wall for dependably releasably constraining said opposite end of the discharge tube within said notch and said arcuate edge of the scoop in self-centering engagement with said inner conical surface of the bottom wall.

References Cited

UNITED STATES PATENTS

| | | | |
|---|---|---|---|
| 1,280,654 | 10/1918 | Bream | 222—456 |
| 1,482,126 | 1/1924 | Gibson | 222—456 |
| 1,498,491 | 6/1924 | Stinson et al. | 222—456 |
| 1,941,745 | 1/1934 | Higley | 222—456 |
| 2,152,004 | 3/1939 | Van Schoor | 222—456 X |
| 2,665,036 | 1/1954 | Riva | 222—456 X |
| 3,223,295 | 12/1965 | Falerni et al. | 222—456 X |

RAPHAEL M. LUPO, *Primary Examiner.*